June 27, 1939. W. J. MACK 2,164,117
PARING KNIFE
Filed Aug. 10, 1938
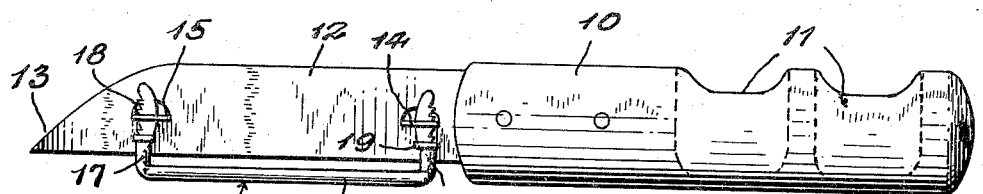
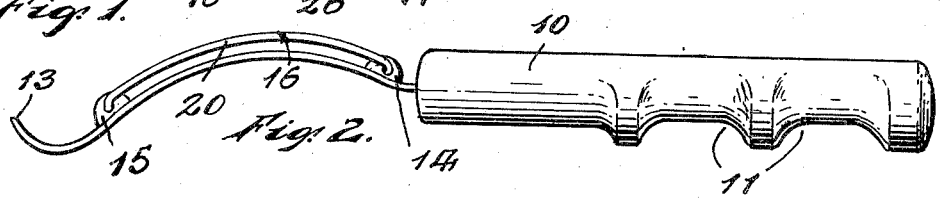
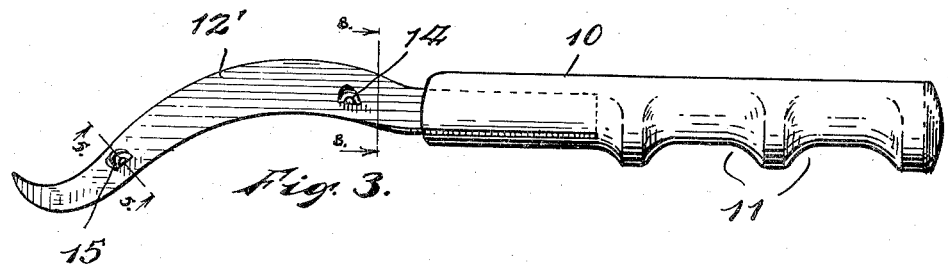
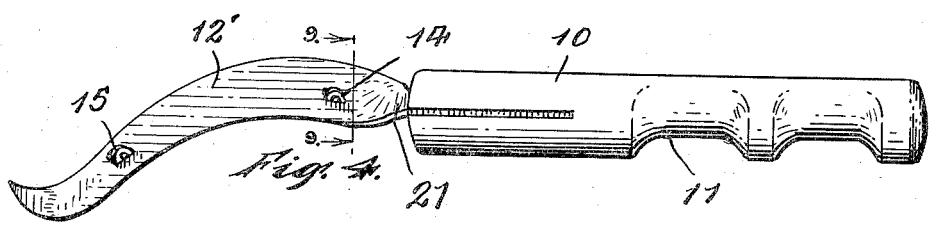
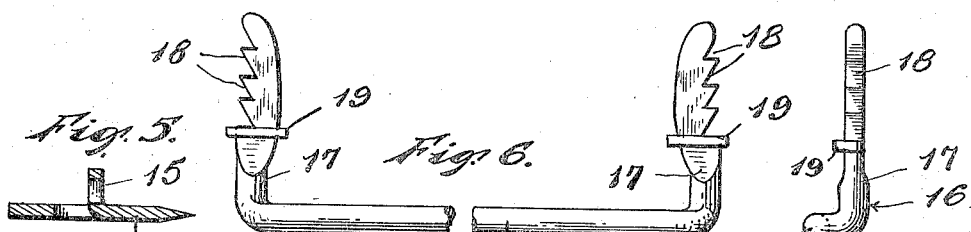
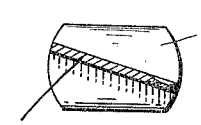
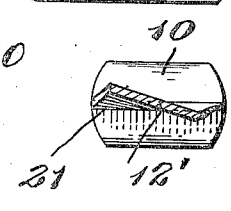
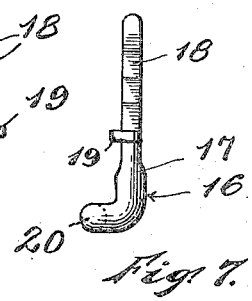
INVENTOR:
William J. Mack,
BY Christian L. Nielsen
ATTORNEY.

Patented June 27, 1939

2,164,117

UNITED STATES PATENT OFFICE 2,164,117

PARING KNIFE

William J. Mack, Buffalo, N. Y.

Application August 10, 1938, Serial No. 224,186

3 Claims. (Cl. 30—283)

This invention relates to knives, particularly paring knives and it consists in the constructions, arrangements and combinations herein described and claimed.

It is an object of the invention to provide a paring knife embodying a guide means regulating the thickness of cut of peeling removed from a potato, fruit, or the like, as well as protecting the user against cuts in the event of slippage of the knife in use.

It is also an object of the invention to provide a paring knife which is provided with a combined guard and gauge which is removable for cleaning of the guard and knife.

It is a still further object of the invention to provide a paring knife having a handle constructed to prevent slippage of the hand when in use.

Additional objects, advantages and features of invention will be apparent from the following description and accompanying drawing wherein Figure 1 is a plan view of a knife constructed in accordance with my invention.

Figure 2 is an edge view thereof.

Figure 3 is a plan view of a modified form of blade.

Figure 4 is a modified form thereof.

Figure 5 is a cross section on the line 5—5 of Figure 3.

Figure 6 is an enlarged plan view of the guard.

Figure 7 is an end view thereof.

Figure 8 is a cross section on the line 8—8 of Figure 3.

Figure 9 is a cross section on the line 9—9 of Figure 4.

In carrying out the invention, I provide a handle 10 of any suitable material in which there is provided, in an appropriate side thereof, recessed portions 11 adapted to accommodate certain fingers of the user, affording stable grip upon the knife.

In the form shown in Figure 1, the blade 12 is arcuately curved so as to fit the outer surface of a potato or other vegetable or fruit to be pared, the blades terminating in a recurved pointed end 13. The point 13 is so shaped as to be employed in removal of the eyes of a potato, pineapple, etc.

Slightly in advance of the handle 10, a right angularly extended eyelet 14 is formed and at a suitable distance forwardly thereof, a similar eyelet 15 is provided, these eyelets affording means for support of a guide 16 presently to be described. The eyelets 14 and 15 in the present instance, are shown as struck out from the body of the blade, although other forms of eyelets may be provided as found practical and desirable.

In all of the forms of the knife, the blade will be of arcuate formation, the eyelets being positioned upon the convex portion of the blade, as may be seen in Figure 2, and within respective eyelets 14—15 there is adjustably secured the guard 16.

The guard in the present instance is formed from a single strand of suitable gauge steel or wire, bent into substantially U-shape, providing arms 17, which as clearly shown in Figure 7, are offset slightly with respect to the bight portion of the guard. The extremities of the arms 17 are flattened and upon the outer longitudinal edges thereof serrations 18 are formed. Inwardly of the serrations 18, each leg includes a stop lug 19, which functions to limit inward movement of the guard beyond a desired point, as will be apparent as the description proceeds. The guard will have a curvature corresponding to that of the blade of the knife and will lie in parallel relation.

In use, the legs 17 of the guard are presented in respective apertures of the ears 14 and 15, and this may be done by pressing the legs slightly toward each other so as to pass freely through the apertures. The legs are released when the bight portion 20 has been brought into a desired position with respect to the cutting edge of the blade. Upon release of the arms 17, due to the resilience of the steel or wire, the arms will move to their normal position, causing engagement of one of the serrations with the edge of the hole in the ears. The lugs 19 will engage the earms 14—15 in the event that the guard is moved in fully, and these lugs are so positioned that the bight 20 may not move inwardly to expose the cutting edge and thus endanger the user.

The serrations 18 are inclined in a direction to permit release of the guard from the ears 14—15 by a straight outward pull, permitting ready cleaning of the knife and guard.

In Figures 3 and 4 modified shapes of blades and their securement to the handles are illustrated. In each instance, the blades 12' are curved longitudinally in an ogee curve, and in Figure 3 the tang of the blade is positioned and secured in an inclined slot formed in the handle (see Figure 8). In Figure 4, the tang is given a slight twist, as at 21 (Figure 9) for accommodation in a transverse slot of the handle.

While I have shown and described preferred forms of the knife and guard, this is by way of illustration only, and I consider as my own all such modifications in structure as fairly fall within the scope of the appended claims.

I claim:

1. A paring knife comprising a blade, a pair of ears on a flat face of the blade, spaced medially and longitudinally thereof, a spring steel wire guard having an offset leg member at the ends extended at an angle to frictionally engage an aperture in the ears, a stop lug on the leg members cooperable with the ears to limit inward movement of the legs within the apertures, and the major portion of the length of the wire lying parallel but spaced outwardly of the cutting edge of the blade.

2. A paring knife comprising a handle and an arcuate shaped blade, a pair of ears on a flat face of the blade, spaced medially and longitudinally thereof, a spring steel wire guard having an offset leg member at the ends extended at an angle, said legs having a plurality of serrations on their outer sides adapted to engage a side of an aperture in the ears, a stop lug on the legs cooperable with the ears to limit inward movement of the legs within the apertures, and the major portion of the length of the wire being arcuately curved to lie parallel but spaced outwardly of the cutting edge of the blade.

3. A paring knife comprising a handle having finger receiving recesses, a blade fixed to the handle, said blade being convexly curved transversely of its length, a pair of ears on the convex portion of the blade, said ears being spaced medially and longitudinally of the blade, a spring steel wire guard having an offset leg at the ends extended at an angle, said legs having a plurality of serrations on their outer sides adapted to engage a side of an aperture in the ears, a stop lug on the legs cooperable with the ears to limit inward movement of the leg within the apertures, and the major portion of the length of the wire being convexly curved to lie parallel but spaced outwardly of the cutting edge of the blade.

WILLIAM J. MACK.